United States Patent
Henderson et al.

(10) Patent No.: US 6,731,653 B1
(45) Date of Patent: May 4, 2004

(54) METHOD AND APPARATUS FOR HANDLING MULTIPLE DATA SUBSCRIBERS AT A CENTRAL SITE

(75) Inventors: P. Michael Henderson, Tustin, CA (US); Kenneth Ko, Clearwater, FL (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/274,845

(22) Filed: Mar. 23, 1999

(51) Int. Cl.[7] .............................................. H04M 11/06
(52) U.S. Cl. ..................... 370/490; 370/493; 379/93.01
(58) Field of Search ................................. 370/485, 486, 370/487, 490, 493, 535, 537, 475; 379/93.01, 93.09, 93.14; 725/109, 114, 117, 118

(56) References Cited

U.S. PATENT DOCUMENTS

| | | | |
|---|---|---|---|
| 4,890,316 A | | 12/1989 | Walsh et al. |
| 5,247,347 A | | 9/1993 | Litteral et al. |
| 5,668,857 A | | 9/1997 | McHale |
| 5,784,683 A | * | 7/1998 | Sistanizadeh et al. ......... 725/73 |
| 5,790,543 A | | 8/1998 | Cloutier |
| 5,898,761 A | * | 4/1999 | McHale et al. .......... 379/93.01 |
| 6,084,885 A | * | 7/2000 | Scott ........................... 370/455 |
| 6,088,385 A | | 7/2000 | Liu |
| 6,137,839 A | | 10/2000 | Mannering et al. |
| 6,151,335 A | | 11/2000 | Ko et al. |
| 6,282,273 B1 | * | 8/2001 | McHale et al. .......... 379/93.28 |
| 6,442,195 B1 | | 8/2002 | Liu et al. |
| 6,510,152 B1 | * | 1/2003 | Gerszberg et al. .......... 370/352 |

OTHER PUBLICATIONS

Henderson, P. Michael, U.S. patent application Ser. No. 09/371,424, filed on Aug. 10, 1999 (Related Application with Claims Amended on Feb. 20, 2003).

Henderson et al., Ser. No. 09/371,424, filed on Aug. 10, 1999, (Amended Claims Only).

* cited by examiner

*Primary Examiner*—Min Jung

(57) ABSTRACT

A communication system for transmitting voice and data information is disclosed. The communication system includes a system converter and a system data pump configured to transform and transmit information between a subscriber and a central location. The system converters convert information between appropriate analog and digital formats. The data pump modulates and demodulates information and is configured to operatively couple to one or more system converters.

7 Claims, 4 Drawing Sheets

METHOD AND APPARATUS FOR HANDLING MULTIPLE DATA SUBSCRIBERS AT A CENTRAL SITE

CROSS REFERENCE TO RELATED APPLICATIONS

This Patent Application is related to U.S. patent application entitled "Method and Apparatus for Transmitting Data Between a Central Site and Multiple Data Subscribers", filed on Aug. 10, 1999 and assigned Ser. No. 09/371,424.

FIELD OF THE INVENTION

The present invention generally relates to electronic data communication systems. In particular, the invention relates to a technique for managing multiple electronic data subscribers in an efficient manner at a central site.

BACKGROUND OF THE INVENTION

The advent of Internet service and video communication, among other advances associated with the transmission of electronic data, has generated an increased consumer desire for electronic data transfer to and from an equipment terminal such as a computer, television, or the like. This increased desire has generated an increased demand for communication providers, such as telephone companies and Internet service providers, to handle increasing amounts of data.

Existing telephone infrastructures such as the public switched telephone network (PSTN) may be used to transfer both telephone service (e.g., voice band data) and electronic data (e.g., video with or without accompanying audio) to and from a telephone or terminal. Using an existing telephone network infrastructure to transfer data to and from a terminal allows communication providers such as telephone companies to leverage their existing telephone connections to households for both voice and data transfer. In particular, existing phone lines of the PSTN, typically twisted-pair wires, may be used to transmit both telephone service and data. The twisted-pair wires may generally transmit data at frequencies up to several MHz; however, the PSTN generally includes filters and data sampling apparatus that limit voice frequency bandwidth to about 3000 Hz. Consequently, data transfer over the PSTN is also generally limited to a bandwidth of about 3000 Hz, absent modifications to the PSTN.

Digital subscriber line (DSL) communication systems and the like may be used to transmit information over twisted-pair wires over a greater bandwidth, e.g., up to several MHz by bypassing the voice frequency digital sampling apparatus and at least some of the PSTN filters. DSL systems generally include a subscriber modem attached to a subscriber terminal and a corresponding system modem located within or proximate a central office of the PSTN. The system modem typically includes analog-to-digital converters, digital-to-analog converters, and bit pumps to convert electronic information into appropriate formats for transmission over PSTN lines.

Because space requirements and power consumption at the central office increases with each additional modem in the central office, it may be desirable to minimize the number of modems or processors in the central office. Also, data transmitted over communication lines typically occurs in bursts; i.e., there may not be a continuous stream of data. Hence, the central office may be able to provide data transfer service to a number of subscribers that exceeds the actual number of modems or processors resident at the central office. In other words, it may provide oversubscription of data transfer services.

A DSL system that allows oversubscription of consumer modems to a central office is disclosed in U.S. Pat. No. 5,668,857, issued Sep. 16, 1997 to McHale. The system disclosed in the McHale patent includes a communication server, located within a central office of a PSTN, which includes a switch, a modem pool, and a controller connected to both the switch and the modem pool. The controller detects a need for data transfer service from the subscriber and directs the switch to couple the subscriber transfer line to a selected subset of modems in the modem pool. The switch disclosed in the McHale patent is analog, i.e., the format of the signal is analog on both the input and output data lines connected to the switch. An output signal from the switch is transferred to the system modem, which converts the signal from an analog format to a digital format.

Analog switching of data lines connected to modems may be inadequate in several regards. For example, analog switching may be inefficient because, in part, when data is transmitted to a subscriber modem, time is required to determine which system modem will connect to the subscriber modem, and time is required to form the connection. Analog switching techniques may require additional system modems located within or near the central office to overcome the time requirements for modem selection and switching.

Additional problems with using analog switching of lines that are transmitting data in analog format may include the generation of transients in a circuit as the switch is activated and deactivated. Additionally, analog switching may be unreliable and require significant board space at the central office. For these reasons and others, analog switching of data communication lines may be relatively expensive. Therefore, improved methods and apparatus for efficiently handling multiple data transmission subscribers are desirable.

SUMMARY OF THE INVENTION

The present invention provides an improved method and apparatus for transmitting voice and electronic data over a public switched telephone network. While the way in which the present invention addresses the drawbacks of the now-known data communication systems and components thereof will be described in greater detail hereinbelow, in general, in accordance with various aspects of the present invention, the inventive apparatus provides an improved communication system that allows a fewer number of system data pumps (which modulate and demodulate information) than a number of subscribers desiring data communication. In addition, the inventive system is configured such that the system does not require analog switching to connect subscribers to the data pumps. Thus, unwanted problems such as time delay associated with analog switching methods and apparatus are reduced.

In accordance with an exemplary embodiment of the present invention, the communication system includes a number of data converters, each configured to connect to a subscriber modem or terminal, and a number of data pumps, wherein the number of the data converters is greater than the number of data pumps.

In accordance with another embodiment of the present invention, each converter includes an analog front end configured to communicate with the subscriber modem or terminal, an analog-to-digital converter, and a digital-to-analog converter.

In accordance with a further embodiment of the present invention, a plurality of converters are connected to a single data pump. Multiple converters may also be connected to multiple data pumps.

In accordance with another embodiment of the present invention, the data pump broadcasts data simultaneously to all subscriber modems or terminals attached to the data pump. The data includes information to identify the subscriber modem or terminal which is to convert and decode the data for a particular subscriber's use.

BRIEF DESCRIPTION OF THE DRAWINGS

A more complete understanding of the present invention may be derived by referring to the detailed description and claims, considered in connection with the figures, wherein like reference numbers refer to similar elements throughout the figures, and:

DETAILED DESCRIPTION OF EXEMPLARY EMBODIMENTS

The present invention generally relates to a communication system and components thereof configured to transmit electronic information. More particularly, this invention provides a system and system components for high-speed data transmission using a plurality of subscriber modems connected to a lesser number of system data pumps. While the present invention may be used to transmit various types of electronic data, the invention is conveniently described hereinbelow in connection with a system that is configured to transmit both voice and electronic data information.

Figure 1:
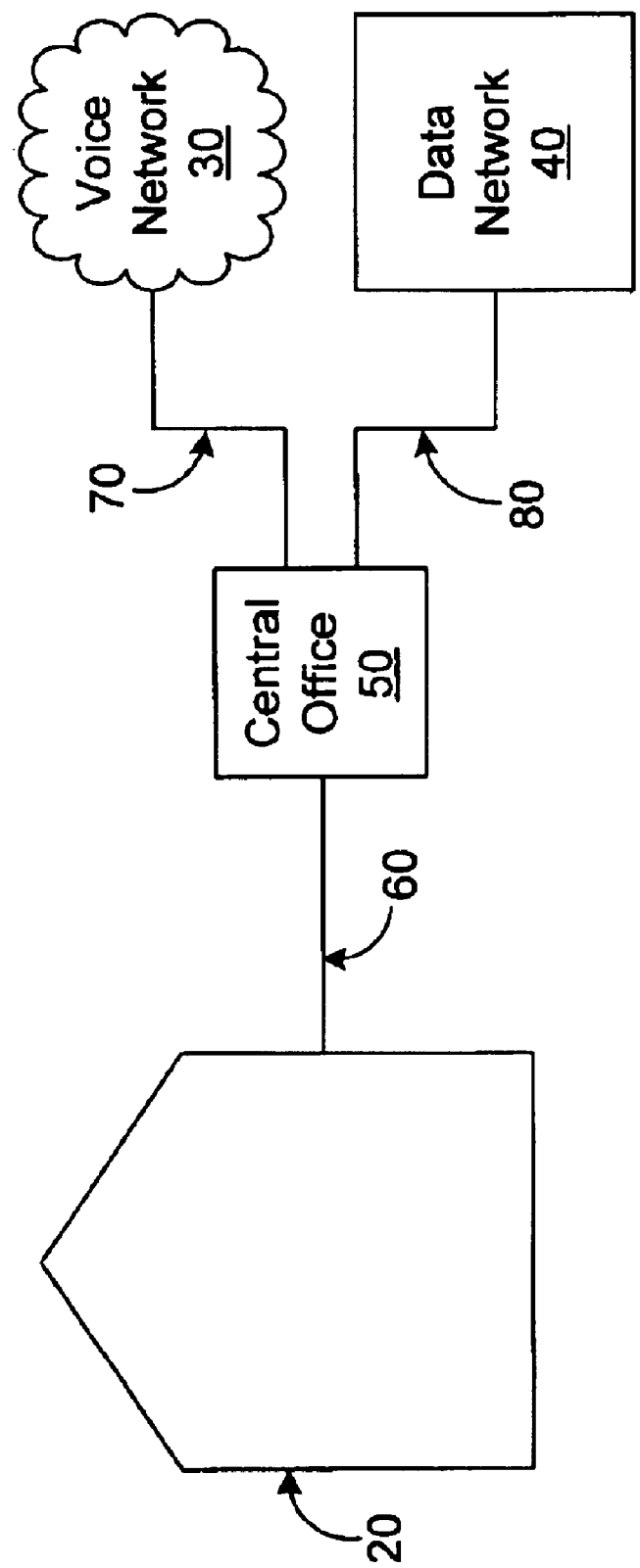
FIG. 1 is a schematic representation of a communication system in accordance with the present invention.

FIG. 1 illustrates a communication system 10 in accordance with the present invention. System 10 is generally configured to facilitate voice and data transmission between a subscriber 20 and a voice network 30, a data network 40, or a combination thereof.

Information preferably travels a portion of the distance between subscriber 20 and networks 30, 40 in analog format and a portion of the distance in digital format. In particular, information preferably travels between subscriber 20 and a central location or hub such as a central office 50 of a publicly switched telephone network (PSTN) in analog format (e.g., over a transmission line 60), and between central office 50 and networks 30 (e.g., over a transmission line 70), 40 (e.g., over a transmission line 80) in digital format. Accordingly, central office 50 preferably includes apparatus capable of transforming voice, data, or both information into appropriate formats for transmission between subscriber 20 and network 30, 40. Although networks 30, 40 and transmission lines 70, 80 are shown separated in FIG. 1, networks 30, 40 may be combined as may lines 70, 80.

As noted above, voice and data information are preferably transmitted between subscribers 20 and central office 50 over line 60. Transmission line 60 preferably includes a medium suitable for electronic data transfer, such as wire, coaxial cable, fiber optic cable, or the like. In a particularly preferred embodiment of the present invention, line 60 includes twisted-pair wires. Use of twisted-pair wires may be advantageous in several respects. In particular, the "plain old telephone system" (POTS) generally includes twisted-pair wire already connected to actual or potential subscribers 20. However, in accordance with alternative embodiments of the present invention, subscribers 20 may communicate with central office 50 using analog, digital or any other form of wireless communication.

Figure 2:
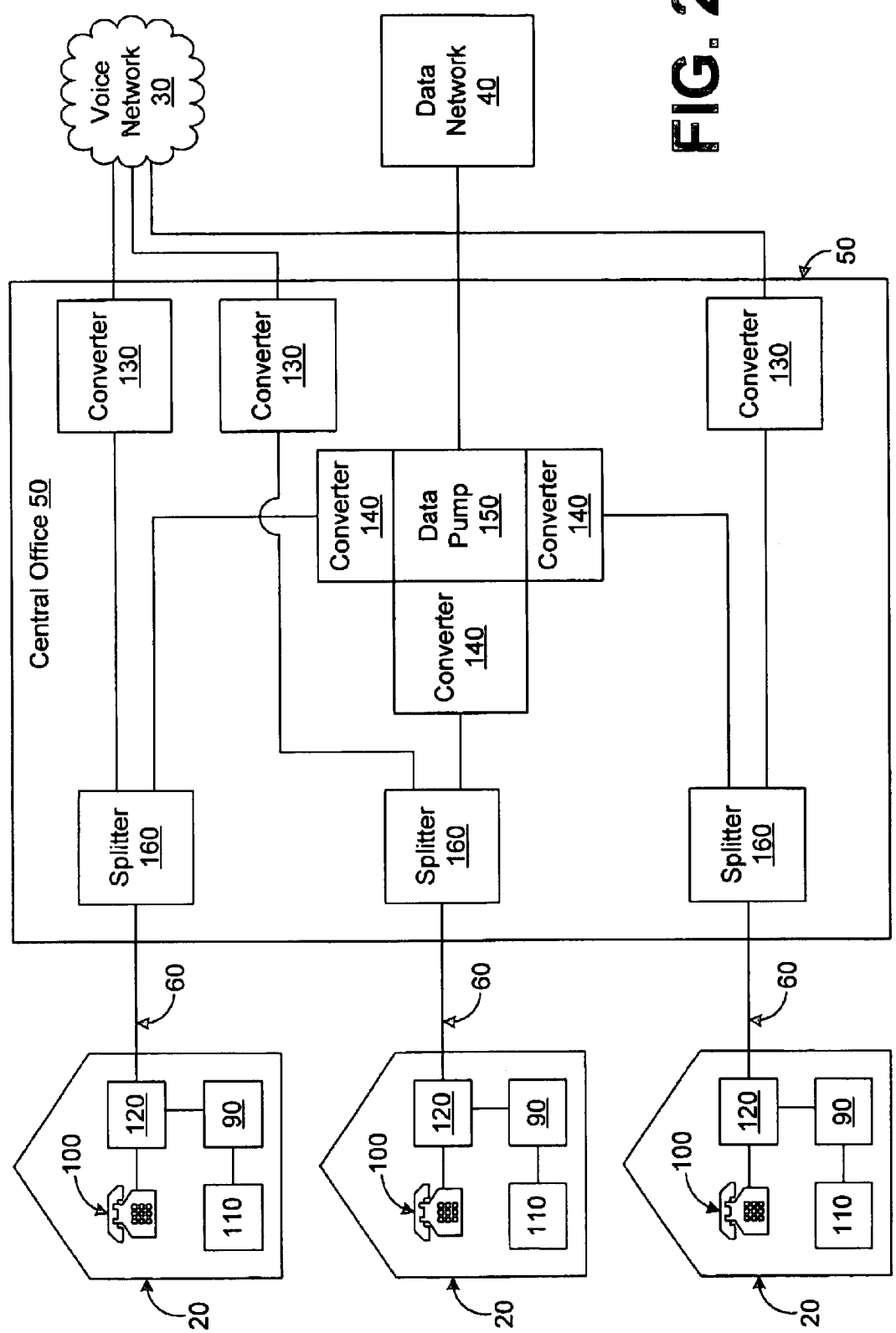
FIG. 2 is a schematic diagram showing multiple subscribers connected to a single data pump.
Figure 3:
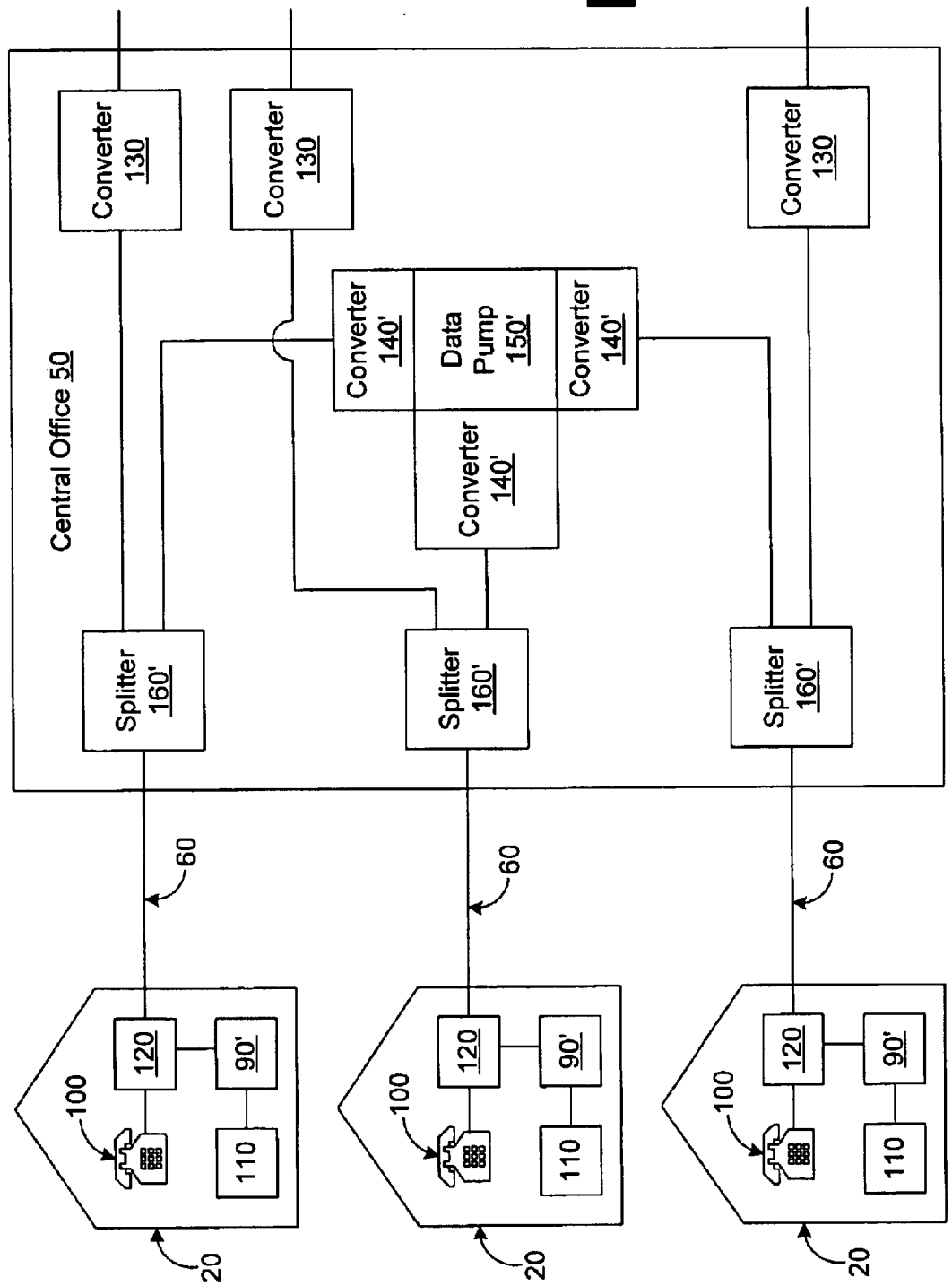
FIG. 3 is a schematic diagram showing multiple subscribers connected to a single data pump in accordance with an alternate embodiment of the present invention.

FIG. 2 illustrates central office 50 and multiple subscribers 20 attached thereto in greater detail. Subscriber 20 may include, among other things, subscriber apparatus such as a subscriber modem 90, a voice band device 100 such as a telephone, and a terminal 110 (which may be integral with modem 90). Terminal 110 may include a computer, a cathode ray tube, a flat panel display, a television, or the like. In addition, subscriber 20 may include a frequency splitter 120 attached to modem 90 as shown in FIG. 2. Although FIGS. 2 and 3 show only one device 100 and one terminal 110 attached to subscriber splitter 120 or to line 60, splitter 120 and any device configured to interface between line 60 and terminal 110 and device 100 are typically configured to communicate with any number and any combination of devices 100 and terminals 110. In other words, multiple devices 100 and terminals 110 may be connected to a single subscriber splitter 120 or various other interface devices.

Central office 50 is configured to receive information from terminal 110 and device 100 and transform the information into a format suitable for upstream travel to networks 30, 40. Likewise, central office 50 is configured to transform data from networks 30, 40 into formats compatible with downstream travel to devices 100 and terminals 110.

To transform information into the appropriate format and in accordance with an exemplary embodiment of the present invention, central office 50 includes a converter 130 to convert voice information between digital and analog format, a converter 140 to convert data between digital and analog format, and a data pump 150 to modulate and demodulate payload information for a particular communication protocol. Converters 130, 140 and pump 150 are described in greater detail below. Office 50 may also include a frequency splitter 160 to separate information into voice band (e.g., less than about 4000 Hz) and data band (e.g., greater than about 25 kHz to a few MHz).

Various system components such as subscriber modems 90, 90', converters 140, 140', data pumps 150, 150' and system splitters 160, 160' and the like may vary from application to application and may depend on whether subscriber splitter 120 is employed to facilitate information transmission. Alternatively, the components may be substantially similar or may be programmable or adaptable such that they may be used in accordance with various embodiments of the present invention. For sake of brevity, the invention will generally be described hereinbelow in connection with modem 90, converter 140, pump 150, and splitter 160. However, it should be understood that modem 90', converter 140', pump 150', and splitter 160' (shown in FIG. 3) may generally be substituted in the description below for their corresponding components shown in FIG. 2. Also, although shown as part of central office 50, any combination of components such as converters 140, data pumps 150, and splitters 160 may be located outside (i.e., remote from) central office 50.

System 10 may include one or more splitters 120, 160 to facilitate both voice and data transmission over line 60. In general, splitters 120, 160 separate, superimpose, or both voice and data information from or onto line 60. Accordingly, subscribers 20 not desiring data transmission need not be connected to splitters 120, 160. That is, subscribers 20 desiring only voice band transmission may be connected directly to converters 130.

System frequency splitter 160 is configured to separate voice and data information (e.g., from line 60) for upstream travel and to superimpose voice and data information (e.g., onto line 60) for downstream travel. Splitter 160 may include active, passive, or both filters to separate information into high frequency data and low frequency voice bandwidths. Although splitter 160 is shown in FIG. 2 as separated from converters 140, splitters 160 may suitably be attached or integral with converters 140. Also, although not shown in the figures, systems 10 in accordance with various embodiments of the present invention may not include splitter 160, 160'. Rather, all information may be transmitted to converter 130, converter 140, or both.

Subscriber splitter 120 is similarly configured to multiplex and demultiplex voice and data information transmitted between subscriber 20 and central office 50. In particular, splitter 120 is preferably configured to demultiplex information received from line 60 or the like (into a format compatible with device 100 and terminal 110) and to multiplex information from device 100 and terminal 110 onto line 60 for upstream travel.

Voice information separated from data information at system splitter 160 is preferably converted from analog format to digital format at converter 130 for upstream travel to voice network 30. Similarly, voice information may be transformed from digital to analog format at converter 130 for downstream travel to splitter 160 and multiplexed with data information at splitter 160.

Data information is similarly converted between analog and digital format at central office 50. In particular, after voice information is filtered from the data information, the data information is converted at converter 140 into a digital format compatible with data pump 150. Preferably, each converter 140 includes an analog front end configured to interface with line 60, a digital-to-analog converter, and an analog-to-digital converter for appropriate data transformation.

In accordance with an exemplary embodiment of the present invention, each subscriber 20 desiring high speed data transmission is connected to at least one converter 140. Subscribers not desiring such service need not be connected to converters 140.

Each converter 140 is configured to communicate with at least one data pump 150 such that converters 140 transmit data to data pump 150 for upstream travel and receive data from pump 150 for downstream travel. In particularly preferred embodiments of the present invention, more than one converter 140 is attached to data pump 150. Although not shown in the figures, multiple converters 140 may be connected to a plurality of data pumps 150. In such a case, data pumps 150 may be integrated such that various data pumps 150 communicate with each other.

Data pump 150 is generally configured to perform particular modulation or demodulation for a particular protocol; various exemplary protocols are described in more detail below. For upstream transmission, data may be demodulated using various techniques such as discrete multitone demodulation, carrierless amplitude phase demodulation, or the like. Similarly, data pump 150 may employ various modulation techniques for downstream transmission such as quadrature amplitude modulation (QAM), pulse amplitude modulation (PAM), discrete multitone (DMT), or the like. Although information transmitted from pump 150 to subscriber 20 is typically intended for only one subscriber 20, in accordance with an exemplary embodiment of the present invention, data pump 150 broadcasts information to all subscribers 20 attached to pump 150. Accordingly, information broadcast downstream from pump 150 generally includes information identifying modems 90 which are to decode the information and transmit data further downstream to terminal 110. In addition, the data preferably includes information that allows all modems 90 to maintain synchronization with data pump 150.

In accordance with an exemplary embodiment of the present invention, data pump 150 may transmit link protocols downstream to subscriber modems 90 to, for example, allow each subscriber modem 90 to identify which downstream data is intended for it, prevent more than a desired number of subscriber modems 90 from attempting to transmit data to a single bit pump 150 at one time, and allow downstream transmission to each subscriber modem 90 at about the maximum rate supported by a particular modem 90.

Figure 4:
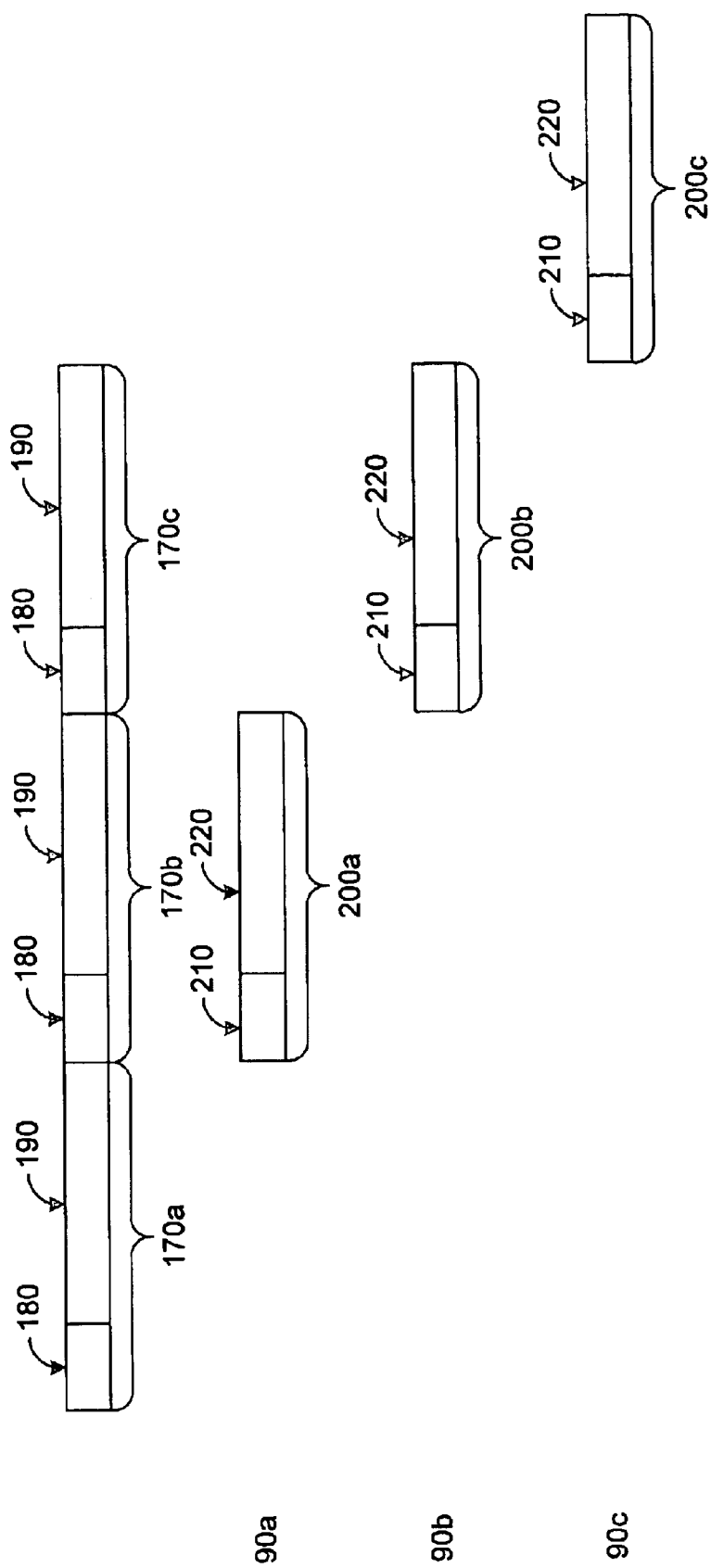
FIG. 4 is a schematic representation of data frames sent between a subscriber and a data pump in accordance with the present invention.

FIG. 4 illustrates a schematic representation of information transmitted between subscriber 20 and data pump 150. In accordance with exemplary embodiments of the present invention, data pump 150 broadcasts information in a frame 170 that includes a header segment 180 and a payload segment 190. Frames 170 may also include additional information such as error correction information, e.g., cyclic redundancy checking (CRC), and the like.

In accordance with exemplary embodiments of the present invention, header segment 180 includes address information to identify which modem or modems 90 are to decode the payload information for further transmission downstream. Segment 180 may also contain information such as parametric information for corresponding payload segment 190.

Header segment 180 is preferably configured such that information contained therein may be decoded by all modems attached to data pump 150. Accordingly, information contained in header segment 180 is transmitted using a relatively low complexity, low data rate constellation that is preferably supported by all modems 90 operatively connected to data pump 150.

Payload segment 190 generally contains payload information to be received by modem 90. Typically the information is intended for a single modem 90 identified in header segment 180. Because information within payload segment 190 is generally only intended for one modem 90, the payload information may be transmitted at a constellation complexity commensurate with modem 90 configured to receive the payload information. In other words, the payload information may be transmitted at the highest complexity constellation supported by modem 90 via channel 60.

In accordance with exemplary embodiments of the present invention, all modems 90 connected to data pump 150 maintain synchronization with data pump 150. Synchronization between modems 90 and pump 150 may be maintained in a variety of ways. For example, synchronization may be maintained by defining a payload segment 190 length such that all modems 90 attached to pump 150 maintain synchronization using baseband information within corresponding header segment 180. In this case, payload segments 190 are preferably sufficiently short such that baseband timing is not lost during payload segment 190 transmission. Alternatively, modems 90 may use passband timing recovery techniques to maintain synchronization.

In accordance with exemplary embodiments of the present invention, each modem 90 broadcasts information in an upstream frame 200 that includes a header segment 210 and a payload segment 220. Frames 200 may also include additional information such as error correction information, e.g., CRC, and the like.

In accordance with an exemplary embodiment of the present invention, data pump 150 transforms information from one modem 90 at a time. Polling techniques may be used to facilitate reception of information by pump 150 from one modem 90 at a time. An example of information received by pump 150 using a polling technique is shown in FIG. 4. In this embodiment, modem 90 may only send data upstream to data pump 150 in response to a signal modem 90 receives from pump 150. The identity of modem 90 is transmitted within header segment 210 in each upstream frame 200. For example, downstream frame 170a to a first subscriber modem 90a is followed by an upstream frame 200a from modem 90a. Similarly, downstream frames 170b and 170c to modems 90b and 90c are followed by corresponding upstream frames 200b, 200c from respective modems 90b and 90c.

Header 210 preferably includes a preamble signal, and more preferably, the preamble signal is located at the beginning of header 210 (e.g., within the first few bits). The preamble may be used to restore synchronization between modem 90 and data pump 150.

Preferably, the preamble is of sufficient duration or length to accommodate differences in channel delay such that the different propagation delays between pump 150 and various modems 90 do not detrimentally affect data transmission. For example, as shown in FIG. 4, data from modem 90b may be sent upstream to data pump 150 prior to completion of data transmission from modem 90a to pump 150. If the preamble from 90b is of sufficient duration to cover the overlap between sequential upstream frames 200, pump 150 may complete decoding information from modem 90a before it starts decoding information from modem 90b.

Various other methods may be used to facilitate data pump 150 receiving information from one modem 90 at a time. For example, header 180 may provide or include modem 90 address information to facilitate transmission. In particular, header 180 may contain separate fields for the address of the downstream recipient for the current slot and the address of the upstream transmitter for the next slot. In addition, headers 180, 210 may include an acknowledge character (ACK) or a negative acknowledge character (NAK) message, a request for acknowledgment, a diagnostic message, a management message, or the like.

Another method of facilitating reception of information by data pump 150 from modems 90 includes sending signal information from modem 90 to pump 150. In this embodiment, the information includes a request for attention from pump 150. Such a request may be in the form of change in energy (e.g., an increase), a modified idle carrier within the upstream data, or the like. Data pump 150 may then provide the requesting modem 90 a frame suitable for upstream travel at the next available slot.

To assist transmission between modem 90 and data pump 150, data pump 150 preferably includes storage for parameters to identify various modems 90 and switching mechanisms that allow switching between various parameters substantially quickly. In addition, pump 150 is preferably configured to generate a table of subscriber modem 90 parameters for each modem 90 it services. The parameters generally include modem 90 receiver gain, equalizer taps, timing offset, and the like. Pump 150 may then retrieve the parameters for a particular modem 90 as it receives a signal from modem 90. Preferably the preamble is employed to flush any equalizer or decoder delay lines prior to data pump 150 demodulating the information.

Several types of protocols may be used to facilitate data transmission between various components of system 10. In particular, digital subscriber line (DSL) protocols may be used to facilitate transmission. The DSL protocols may include asymmetric digital subscriber line (ADSL), symmetric digital subscriber line (SDSL), high-speed digital subscriber line (HDSL), and very high-speed digital subscriber line (VDSL). Some of these protocols may require multiple lines 60 between subscribers 20 and central office 50. In accordance with alternate embodiments of the present invention, other protocols now known or hereafter developed may be used to transmit data over line 60. Further, any frequency bands for voice and data transmission may be employed; however, the respective transmission bands are preferably chosen to minimize noise and interference between voice, data, or other signals. In accordance with a particularly preferred embodiment of the present invention, voice information is transmitted over a frequency band ranging from about 300 to 4000 Hz and data is transmitted over a frequency band ranging from about 25 KHz to about 1.1 MHz.

Each subscriber desiring to send electronic information through data pump 150 preferably has at least one subscriber modem 90 operatively coupled to associated converter 140 which is in turn coupled to data pump 150. In one exemplary embodiment, subscriber modems 90 and system converters 140 have a one-to-one relationship. In a particularly preferred embodiment of the present invention, subscriber modem 90 and system converter 140 are substantially constantly connected. This configuration allows terminal 110 to constantly receive information from the data service. As a result, subscribers 20 may be notified upon receipt of information or the like such as receipt of incoming e-mail.

Subscriber modem 90 may include any device capable of transforming (modulating and demodulating) information for transmission between subscriber 20 and data pump 150. In accordance with an exemplary embodiment of the present invention, modem 90 is preferably configured to convert information between digital information capable of being received by terminal 110 and analog information suitable for transmission over line 60. Preferably, modem 90 converts information from terminal 110 into a DSL-compatible format and more preferably into a format compatible with ADSL systems. Modem 90 may be configured in any suitable form that allows communication between terminal 110 and central office 50.

In alternative embodiments of the present invention, converters 140, data pumps 150, or a combination thereof may be configured to store and manipulate data sent to and from subscribers 20. For example, converters 140 or data pumps 150 may calculate and store data transmitted by a particular subscriber modem 90 over a given period of time.

Although the present invention is set forth herein in the context of the appended drawing figures, it should be appreciated that the invention is not limited to the specific form shown. For example, while the output of the system data pump is conveniently shown as connecting to a data network, the data pump may conveniently be attached to a separate terminal or the like. Various other modifications, variations, and enhancements in the design and arrangement of the communication system as set forth herein may be made without departing from the spirit and scope of the present invention as set forth in the appended claims.

What is claimed is:

1. A method for transmitting electronic information between a subscriber and a central location, comprising the steps of:

transmitting electronic information from a subscriber modem to a subscriber splitter;

superimposing said electronic information and a voice signal using said subscriber splitter;

transmitting said superimposed electronic information and voice signal over a transmission line to a system splitter;

separating said electronic information from the voice signal using said system splitter;

transmitting at least a portion of said electronic information to a system converter;

transforming the at least a portion of said electronic information into digital format using said converter;

transmitting the at least a portion of said digital format information to a data pump at the central location, wherein said data pump is configured to receive electronic information from said converter and a plurality of other converters; and simultaneously broadcasting information from said data pump to said subscriber splitter and a plurality of other subscriber splitters.

2. The method of claim 1, wherein the voice signal is transmitted at a frequency less than about 4 KHz.

3. The method of system of claim 1, wherein the electronic information is transmitted at a frequency greater than about 25 KHz.

4. The method of claim 1, further comprising the step of including a link protocol in the information simultaneously broadcasted from the data pump, the link protocol identifying the subscriber modem as a recipient of the downstream data.

5. The method of claim 1, further comprising the step of transmitting synchronization information in the information simultaneously broadcasted from the data pump that is to be employed by the subscriber modem to maintain synchronization with the data pump.

6. The method of claim 1, further comprising the step of controlling transmission of the electronic information from the subscriber modem to the subscriber splitter using a polling technique.

7. The method of claim 1, further comprising the step of storing a table in the data pump that includes parametric information corresponding to the subscriber modem.

* * * * *